(12) United States Patent
Pan et al.

(10) Patent No.: US 9,292,931 B2
(45) Date of Patent: Mar. 22, 2016

(54) APPARATUS, METHOD FOR EXTRACTING BOUNDARY OF OBJECT IN IMAGE, AND ELECTRONIC DEVICE THEREOF

(71) Applicant: FUJITSU LIMITED, Kawasaki-shi (JP)

(72) Inventors: Pan Pan, Beijing (CN); Yuan He, Beijing (CN); Jun Sun, Beijing (CN); Satoshi Naoi, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 351 days.

(21) Appl. No.: 13/912,805

(22) Filed: Jun. 7, 2013

(65) Prior Publication Data

US 2013/0330009 A1 Dec. 12, 2013

(30) Foreign Application Priority Data

Jun. 7, 2012 (CN) .......................... 2012 1 0187523

(51) Int. Cl.
 *G06T 7/00* (2006.01)
(52) U.S. Cl.
 CPC ............. *G06T 7/0085* (2013.01); *G06T 7/0083* (2013.01)
(58) Field of Classification Search
 CPC ................ G06T 7/0085; G06T 7/0083; G06T 2207/30068; G06T 5/002; G06T 7/0081; G06T 7/0067; G06K 9/4604; G06K 9/48; H04N 1/00748
 See application file for complete search history.

(56) References Cited

U.S. PATENT DOCUMENTS

| | | | |
|---|---|---|---|
| 5,920,648 A * | 7/1999 | Fujimoto | 382/197 |
| 6,381,350 B1 * | 4/2002 | Klingensmith et al. | 382/128 |
| 2005/0074153 A1 * | 4/2005 | Pedrizzetti et al. | 382/128 |
| 2011/0096954 A1 * | 4/2011 | Dahl | 382/103 |
| 2011/0216984 A1 * | 9/2011 | Tezuka | 382/260 |
| 2012/0057776 A1 * | 3/2012 | Tao et al. | 382/154 |
| 2012/0203530 A1 * | 8/2012 | Sharma et al. | 703/9 |
| 2013/0259386 A1 * | 10/2013 | Chandrashekar et al. | 382/203 |

* cited by examiner

*Primary Examiner* — Edward Park
(74) *Attorney, Agent, or Firm* — Staas & Halsey LLP

(57) ABSTRACT

The invention provides an apparatus and method for extracting a boundary of an object in an image and an electronic device. The apparatus includes: a position determining unit, configured to determine a start point and an end point of a boundary of an object in an image and to determine a position of a reference point relevant to the start point and the end point; a first direction determining unit, configured to determine a first direction of the boundary; a gradient map obtaining unit, configured to obtain a gradient map of a first region; a gradient attenuating unit, configured to attenuate in the gradient map the gradients of a second region; and an extracting unit, configured to extract a boundary of an object. The technology of the invention can improve the accuracy of boundary extracting, and can be applied in the field of image processing.

20 Claims, 6 Drawing Sheets

APPARATUS, METHOD FOR EXTRACTING BOUNDARY OF OBJECT IN IMAGE, AND ELECTRONIC DEVICE THEREOF

CROSS REFERENCE TO RELATED APPLICATIONS

This application claims the benefit of Chinese Application No. 201210187523.2, filed Jun. 7, 2012, the disclosure of which is incorporated herein by reference.

FIELD OF THE INVENTION

The invention relates to the field of image processing, and in particular to an apparatus and method for extracting a boundary of an object in an image, and an electronic device thereof.

BACKGROUND OF THE INVENTION

With the development of the modern electronic technology, products, such as a camera and a scanner, are more widely applied in people's daily life and work. However, images captured by the product such as a camera and a scanner for an object (such as a document and a material object) may have certain distortions, such as perspective transformation distortion and tensile deformation distortion. In order to eliminate image distortion, obtaining accurately the boundary of the object becomes important.

Whatever boundary tracking method is used, it is impossible to obtain an accuracy rate of 100%. As a result, interaction with a user is often required during extracting a boundary of an object in an image, for example, a correct boundary point is input by the user by clicking a mouse. However, there is a lower accuracy when extracting the boundary of the object using the technology in which a boundary of an object is extracted based on the known boundary points.

In addition, some other conventional boundary extracting technologies adopt several control points to represent a whole curve, the user can adjust an ordinate of each control point, and a boundary curve is updated by locally fitting these control points. In order to adjust the whole curve, the user needs to manually adjust for many times, and the finally obtained curve is not smooth on the whole.

SUMMARY OF THE INVENTION

A brief overview of the invention is given hereinafter to provide the basic understanding to some aspects of the invention. It should be understood that, the overview is not the exhaustive overview of the invention, and is neither intended to determine the key or important part of the invention, nor intended to define the scope of the invention. The object of the overview is only to give some conceptions in a simplified form, which can be used as a preface of the more detailed description discussed subsequently.

Based on the disadvantage of the prior art described above, one of the objects of the invention is to provide an apparatus and method for extracting a boundary of an object in an image, and an electronic device thereof, so as to at least overcome the problem of the low extracting accuracy or needing multiple manual adjustments in the existing boundary extracting technologies.

In order to achieve the object described above, according to one aspect of the invention, it is provided an apparatus for extracting a boundary of an object in an image, including: a position determining unit, configured to determine a start point and an end point of the boundary of the object in the image, and to determine a position of a reference point relevant to the start point and the end point; a first direction determining unit, configured to determine a first direction of the boundary; a second direction determining unit, configured to determine a second direction intersecting the first direction of the boundary; a gradient map obtaining unit, configured to determine in the image a first region including the start point, the end point and the reference point, and to obtain a gradient map of the first region; a gradient attenuating unit, configured to determine at least one second region on at least one of two sides of the reference point along the second direction and to attenuate in the gradient map the gradients of the second region; and an extracting unit, configured to extract a boundary between the start point and the end point based on the attenuated gradient map to obtain the boundary of the object.

According to another aspect of the invention, it is provided a method for extracting a boundary of an object in an image, including: determining a start point and an end point of the boundary of the object in the image, and obtaining a position of a reference point relevant to the start point and the end point; determining a first direction of the boundary; determining a second direction intersecting the first direction of the boundary; determining in the image a first region including the start point, the end point and the reference point, and obtaining a gradient map of the first region; determining at least one second region on at least one of two sides of the reference point along the second direction; attenuating in the gradient map the gradients of the second region, and extracting a boundary between the start point and the end point based on the attenuated gradient map to obtain the boundary of the object.

According to another aspect of the invention, it is provided an electronic device including the apparatus for extracting a boundary of an object in an image described above.

According to another aspect of the invention, it is also provided a computer readable storage medium on which a computer program that can be performed by a computing device is stored, where execution of the computer program enables the computing device to perform the method for extracting a boundary of an object in an image described above.

With the apparatus and method for extracting a boundary of an object in an image according to the embodiments of the invention described above, and the electronic device thereof, at least one of the following benefits can be obtained: improving the extracting accuracy of boundary, no need for multiple manual adjustments by the user, improving the processing efficiency and facilitating the use of a user.

These and other advantages of the invention will become more obvious hereinafter by means of the detailed illustration of the preferred embodiment of the invention in conjunction with drawings.

BRIEF DESCRIPTION OF THE DRAWINGS

The invention will be better understood with reference to the following description given in conjunction with the drawings. In the drawings, the same or similar reference numerals indicate the same or similar components. The drawings and the following detailed description are included in the specification to form a part of the specification, and are used to further illustrate the preferred embodiments of the invention by means of some examples and explain the principles and advantages of the invention. In the drawings.

Figure 1:
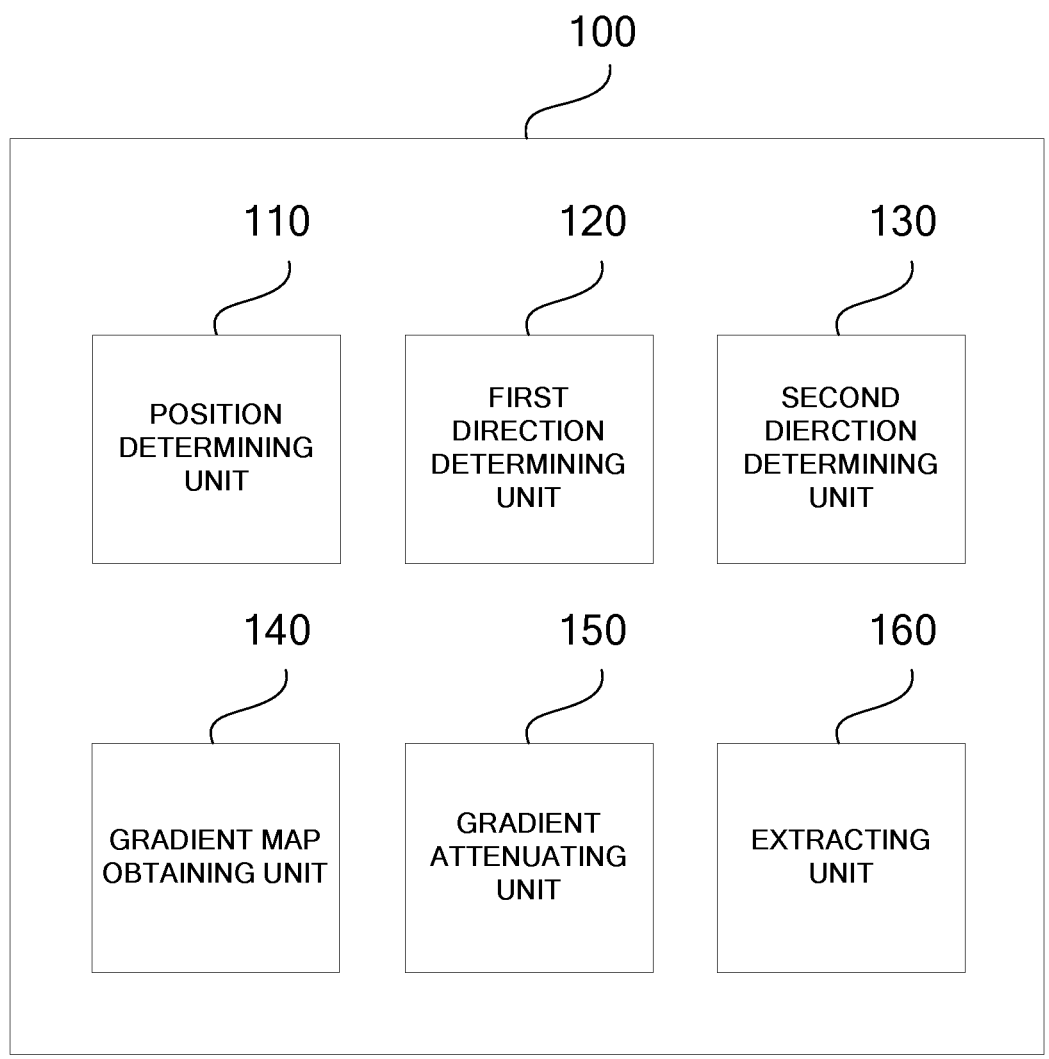
FIG. 1 is a block diagram schematically showing an exemplary structure of an apparatus for extracting a boundary of an object in an image according to an embodiment of the invention.

Those skilled in the art should understand that the elements in the drawings are illustrated for the sake of conciseness and clarity, and are not necessarily drawn to scale. For example, some elements in the drawings can be magnified relative to other elements, in order to facilitate understanding of the embodiments of the invention.

DETAILED DESCRIPTION OF THE INVENTION

The exemplary embodiments of the invention are described hereinafter in conjunction with the drawings. For the sake of conciseness and clarity, not all the features of the actual embodiments are described in the specification. However, it should be understood that, during the process to develop any actual embodiment, specific decisions can be made to the embodiments so as to achieve the specific target of a developer, such as meeting those limiting conditions related to the system and service, and the limiting conditions may vary with different embodiments. In addition, it should be understood that, although the development work may be complex and time-consuming, the development work is just a routine mission for those skilled in the art who obtain benefits from the disclosure of the invention.

Herein, it should be noted that, in order to avoid obscuring the invention with unnecessary details, in the drawings only the apparatus structure and/or processing steps having a close relation with the solution of the invention are illustrated, and other details having a little relation with the invention are omitted.

As described above, the existing boundary extraction technologies have the problem of low extracting accuracy or needing multiple manual adjustments. For this problem, the invention provides an apparatus for extracting a boundary of an object in an image.

The apparatus for extracting a boundary of an object in an image includes: a position determining unit, configured to determine a start point and an end point of the boundary of the object in the image, and to determine a position of a reference point relevant to the start point and the end point; a first direction determining unit, configured to determine a first direction of the boundary; a second direction determining unit, configured to determine a second direction intersecting the first direction of the boundary; a gradient map obtaining unit, configured to determine in the image a first region including the start point, the end point and the reference point, and to obtain a gradient map of the first region; a gradient attenuating unit, configured to determine at least one second region on at least one of two sides of the reference point along the second direction, and to attenuate in the gradient map the gradients of the second region; and an extracting unit, configured to extract a boundary between the start point and the end point based on the attenuated gradient map to obtain the boundary of the object.

FIG. 1 is a block diagram schematically showing an exemplary structure of an apparatus for extracting a boundary of an object in an image according to an embodiment of the invention.

As shown in FIG. 1, the apparatus for extracting a boundary of an object in an image according to the embodiment of the invention includes: a position determining unit 110, a first direction determining unit 120, a second direction determining unit 130, a gradient map obtaining unit 140, a gradient attenuating unit 150 and an extracting unit 160.

As shown in FIG. 1, the position determining unit 110 is configured to determine a start point and an end point of a boundary of an object in an image.

In the specific implementation of the apparatus for extracting a boundary of an object in an image according to the embodiment of the invention, the image may be for example an image captured for a material object or a scanning image captured for a document object, or the like.

The apparatus 100 for extracting a boundary of an object in an image according to the embodiment of the invention is described below in detail by taking the scanning image captured for a document as an example. In this example, the boundary of the object in the scanning image refers to a boundary of the document.

Figure 2:
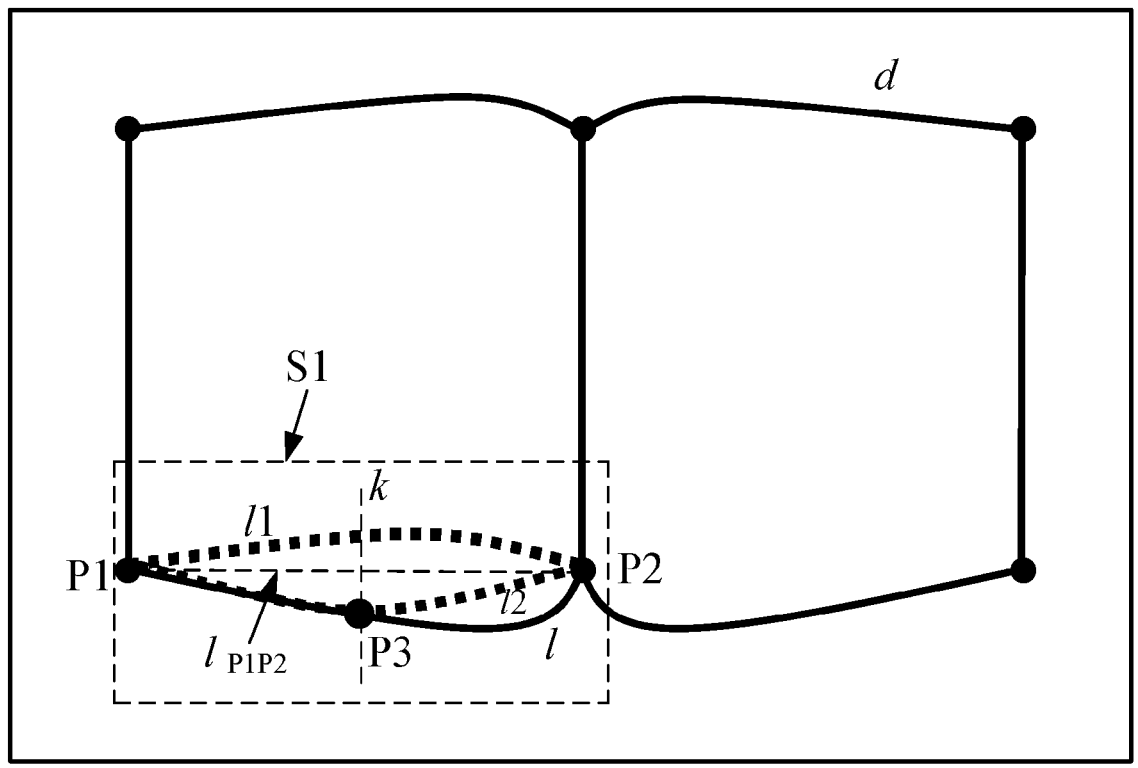
FIG. 2 is a schematic diagram showing an example of a scanning image captured for a document.

FIG. 2 schematically shows an example of a scanning image captured for a document. As shown in FIG. 2, l is a boundary (i.e. a real boundary) of a document d, P1 and P2 are a start point and an end point of the boundary l respectively. Specifically, P1 and P2 here are two document corner points corresponding to the boundary l. It should be noted that the two document corner points (i.e. the start point and the end point of the boundary) can be input by the user by for example an input device such as a mouse or a touch screen; or the two document corner points can be obtained by some existing corner point extracting technologies, which will not be described in detail herein. It should be noted that, for the sake of conciseness and clarity, the contents of the document d is not shown in FIG. 2, but in the actual application, the document d can contain contents therein, such as words and pictures.

L1 shown in FIG. 2 is a boundary extracted between the corner points P1 and P2 by using the existing boundary extracting techniques (such as, a boundary extracting technique based on image gradients). It can be seen from FIG. 2 that, there is a great difference between the extracted boundary l1 based on the corner points P1 and P2 and the real boundary l, this is because the gradients of the contents such as words and pictures contained in the document d (hereinafter, "content gradient" for short) will influence the boundary extracting, which will lead to a deviation in the boundary extracted based on the image gradients. The apparatus 100 for extracting a boundary of an object in an image according to the embodiment of the invention can reduce this deviation. The function and processing of other units in the apparatus 100 will be described hereinafter in conjunction with FIG. 1 and FIG. 2.

The position determining unit 110 can be further configured to determine a position of a reference point relevant to the start point and the end point of the boundary (in the example illustrated in FIG. 2, corner points P1 and P2). In the example illustrated in FIG. 2, P3 is an example of the reference point. The reference point P3 can be input by the user by an input device such as a mouse or a touch screen.

Terms "start point", "end point" and "reference point" herein refer to a single pixel point in the image. When the point that is input as a "start point", "end point" or "reference point" includes multiple pixel points, one of the multiple pixel points (such as a center pixel point of the multiple pixel points) can be selected as the corresponding "start point", "end point" or "reference point".

As shown in FIG. 2, the first direction determining unit 120 can be configured to determine a first direction of the boundary l.

As shown in FIG. 2, in one implementation of the apparatus for extracting a boundary of an object in an image according to the embodiment of the invention, the first direction determining unit 120 can estimate the first direction of the boundary l by obtaining a slope direction of a connecting line $l_{P_1P_2}$ between the corner points P1 and P2 and determining the slope direction of the connecting line $l_{P_1P_2}$ as the first direction of the boundary l.

In addition, in another implementation of the apparatus for extracting a boundary of an object in an image according to the embodiment of the invention, the first direction determining unit 120 can obtain the first direction of the boundary l by the existing methods such as an inclination estimation method. For example, an image block near the reference point P3 is intercepted, the inclination of the image block (such as an included angle with the horizontal direction) is obtained using the existing methods, and the inclination of the image block is used as the first direction of the boundary l.

As shown in FIG. 2, the second direction determining unit 130 is configured to determine a second direction k intersecting the first direction of the boundary l. The second direction k may be any direction intersecting the first direction of the boundary l. Preferably, the second direction k may be a direction perpendicular to the first direction of the boundary l. It should be noted that, the second direction intersecting the first direction herein refers to that the line where the second direction lies intersects the line where the first direction lies (i.e. the angle between the two lines does not equal 0), and the second direction being perpendicular to the first direction refers to that the angle between the line where the second direction lies and the line where the first direction lies equals 90°.

In addition, the gradient map obtaining unit 140 is configured to determine a first region including the corner point P1, the corner point P2 and the reference point P3, and to obtain a gradient map of the first region. In the specific implementation of the apparatus for extracting a boundary of an object in an image according to the embodiment of the invention, the shape of the first region can be any one of rectangular, square, circular or ellipse or the like.

For example, in the example illustrated in FIG. 2, the first region can be a rectangular region S1 including the corner point P1, the corner point P2 and the reference point P3, and the length direction of the rectangular region S1 can extend along for example the slope direction of the connecting line $l_{P_1P_2}$ between the corner points P1 and P2.

In addition, after obtaining the gradient map of the first region, the gradient attenuating unit 150 can determine at least one second region on at least one of two sides of the reference point P3 along the second direction k, and attenuate the gradients of the second region in the gradient map of the first region. In one implementation of the apparatus for extracting a boundary of an object in an image according to the embodiment of the invention, in a case where the gradient map of the first region is a color-inverted gradient map, the gradient attenuating unit 150 can set the gradient value of the second region in the attenuated gradient map to value above the gradient value of the second region in the non-attenuated gradient map; in addition, in the implementation, in a case where the gradient map of the first region is a gradient map without being color-inverted, the gradient attenuating unit 150 can set the gradient value of the second region in the attenuated gradient map to a value below the gradient value of the second region in the non-attenuated gradient map.

In addition, the second region can be any one of a triangular region, a sector region, a banded region and a parabolic region etc., or can be a superposition of at least two of the above various regions. It should be noted that, the determined second region can include the reference point P3, or not include the reference point P3. Preferably, the second region does not include the reference point P3.

The second region can have a predetermined shape and/or size. For example, in a case where the second region is a triangular region, a vertex angle of the triangular region can be 10°, 30° or other preset angles. A part angle α and a part angle β of the vertex angle at the two sides of the second direction k can be distributed evenly, and can also be distributed in accordance with other proportions (such as, the angel α equals 10°, and the angle β equals) 20°.

In addition, the vertex angle and the angle α and angle β can be determined empirically or experimentally.

In addition, in order to prevent the gradient of the real boundary from being attenuated, the gradient attenuating unit 150 can leave some redundancy between the second region and the reference point P3.

For example, in the specific implementation of the apparatus for extracting a boundary of an object in an image according to the embodiment of the invention, the second region can be arranged outside of a neighboring region of the reference point P3 which has a predetermined size. In an example, the neighboring region having a predetermined size can be a circular region or a banded region having a predetermined size which contains the reference point P3, etc.

In one implementation of the apparatus for extracting a boundary of an object in an image according to the embodiment of the invention, a shape and/or a position of the second region can be adjusted in response to an instruction input by a user. For example, if the user inputs a position of the reference point P3, multiple regions having different shapes, such as a triangular region, a sector region, a banded region and a parabolic region, can be displayed at two sides of the reference point P3 along the second direction k in a form of a dotted line block, and at least one of the regions is selected as the second region by the user. In addition, in some examples, the user can manually adjust the shape and/or position of the second region. For example, a side length, a vertex angle, etc of the triangular region selected as the second region are adjusted manually, thus achieving the best processing effect.

Figure 3A:
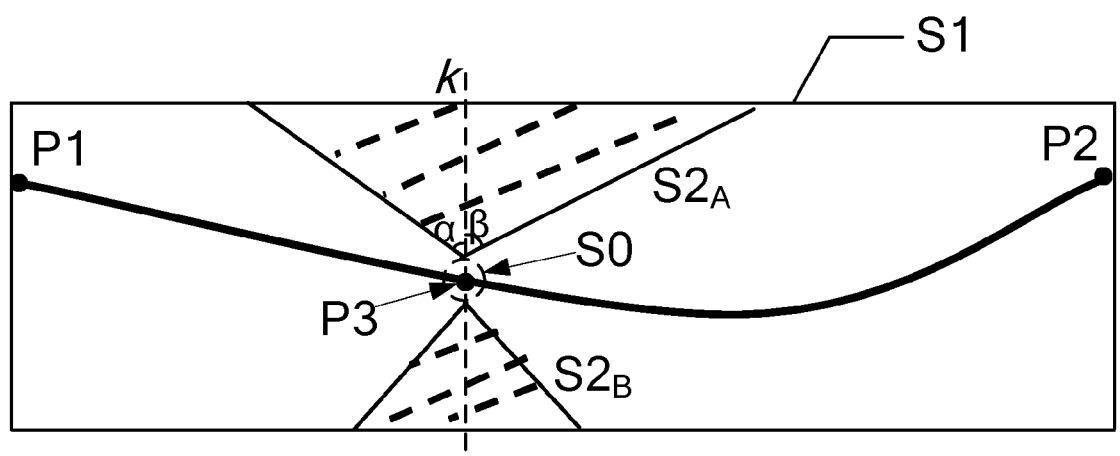
FIG. 3A is a schematic diagram showing an example of a gradient map of a first region.
Figure 3B:
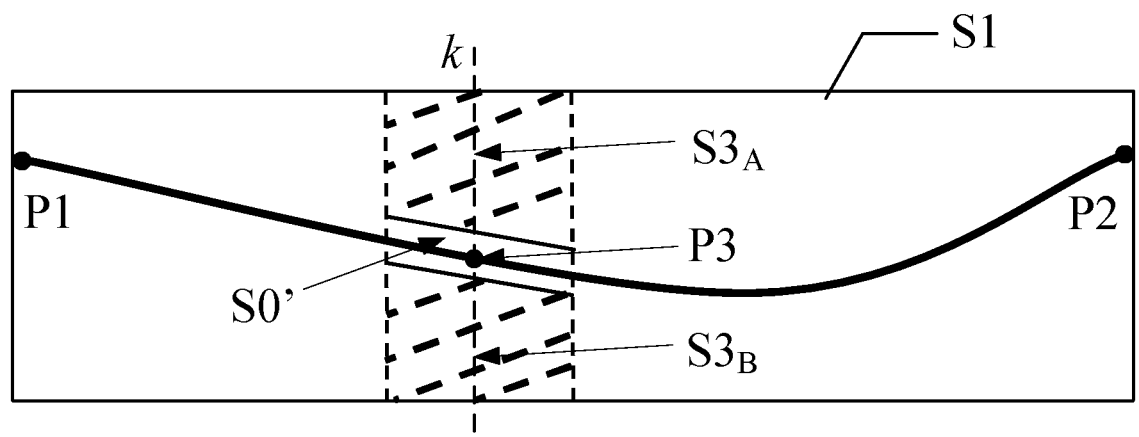
FIG. 3B is a schematic diagram showing another example of the gradient map of the first region.

FIG. 3A and FIG. 3B respectively show gradient maps of the first region S1 shown in FIG. 2. It should be noted that, in general, the background gradient value of the directly obtained gradient map of the image (hereinafter, referred to as the gradient map without being color-inverted) equals 0 or closes to 0. The gradient maps shown in FIG. 3A and FIG. 3B are gradient maps obtained by color-inverting the directly obtained gradient map of the first region S1 (the gradient values of pixel points of the normal gradient map is subtracted from 255 respectively, the gradient map established using the obtained gradient values is a color-inverted gradient map of the normal gradient map) (hereinafter, referred to as the color-inverted gradient map). Consequently, the background gradients of the gradient maps shown in FIG. 3A and FIG. 3B equal 255 or close to 255.

In an example, as shown in FIG. 3A, the gradient attenuating unit 150 can firstly determine a neighboring region of the reference point P3 which has a predetermined size, for example, a circular neighboring region S0 in FIG. 3A which has a predetermined size and a center at a reference point P3, and the size of the circular neighboring region S0 can be set empirically or as required, for example. Then, the gradient attenuating unit 150 can respectively determine one triangular region at each of two sides of the reference point P3 along the second direction k (i.e. $S2_A$ and $S2_B$) as the second region. The triangular regions $S2_A$ and $S2_B$ are respectively located outside of the circular neighboring region S0 of the reference point P3. After determining the second region, the gradient attenuating unit 150 can attenuate, in the first region S1, the gradients of the second regions (i.e. the triangular regions $S2_A$ and $S2_B$), such that the gradients of the attenuated second region are greater than its gradients before attenuation. In an example, the gradients of the triangular regions $S2_A$ and $S2_B$ can be increased (for example, if the original gradient of the triangular regions $S2_A$ and $S2_B$ is 20, the gradient of the attenuated triangular regions $S2_A$ and $S2_B$ can be 100 or more). In another example, the gradients of the triangular regions $S2_A$ and $S2_B$ can be set to 255 directly.

In another example, as shown in FIG. 3B, the gradient attenuating unit 150 can firstly determine a neighboring region of the reference point P3 which has a predetermined size, for example, a banded neighboring region S0' in FIG. 3B which has a predetermined size and a centre at a reference point P3, with the length direction of the banded neighboring region S0' extending along the first direction of the boundary l. The size of the banded neighboring region S0' of the reference point P3 can be set empirically or as required. Then, the gradient attenuating unit 150 can respectively determine one banded region at each of two sides of the reference point P3 along the second direction k (i.e. $S3_A$ and $S3_B$) as the second region. Similarly, the banded regions $S3_A$ and $S3_B$ are respectively located outside of the banded neighboring region S0' of the reference point P3, and attenuation is performed such that the gradient of the attenuated second region is greater than its gradient before attenuation. Herein, the specific example of attenuating the gradient of the banded regions $S3_A$ and $S3_B$ can refer to the above description of the specific example of attenuating the gradient of the triangular regions $S2_A$ and $S2_B$, which will not be described in detail herein.

In addition, it should be noted that, in other examples, if the gradient map of the first region is a gradient map without being color-inverted, the gradient attenuating unit 150 can make the gradient of the attenuated second region less than its gradient before attenuation. In an example, the gradient of the second region can be decreased (for example, if the original gradient of the second region is 200, the gradient of the attenuated second region can be 100 or less). In another example, the gradient of the second region can be set to 0 directly.

In addition, in another implementation of the apparatus 100 and 500 for extracting a boundary of an object in an image according to the embodiments of the invention, the gradient attenuating unit 150 can also determine one second region on one of two sides of the reference point P3 along the second direction k. For example, referring to FIG. 3A, the gradient attenuating unit 150 can determine the triangular region $S2_A$ or the triangular region $S2_B$ as the second region on one of the two sides of the reference point P3 along the second direction k, then the gradient of the second region is attenuated in the gradient map of the first region similarly to the above-described.

Referring to FIG. 3A, in an example, in a case where there is content inside the document d and there is no content outside of the document d, the gradient attenuating unit 150 can determine the triangular region $S2_A$ as the second region on one of the two sides of the reference point P3 along the second direction k (in this case, the second region does not include the triangular region $S2_B$ in FIG. 3A), and the gradient of the second region $S2_A$ is attenuated in the first region S1 according to the way described above. In addition, in another example, in a case where there is no content for example near the margin of the document d and there is content outside of the document d, the gradient attenuating unit 150 can determine the triangular region $S2_B$ as the second region on the other side of the reference point along the second direction k (in this case, the second region does not include the triangular region $S2_A$ in FIG. 3A), and the gradient of the second region $S2_B$ is attenuated in the first region S1 according to the way described above.

After obtaining the attenuated gradient map, the extracting unit 160 can be used to extract a boundary between the corner points P1 and P2 to obtain the boundary of the document d.

Figure 4:
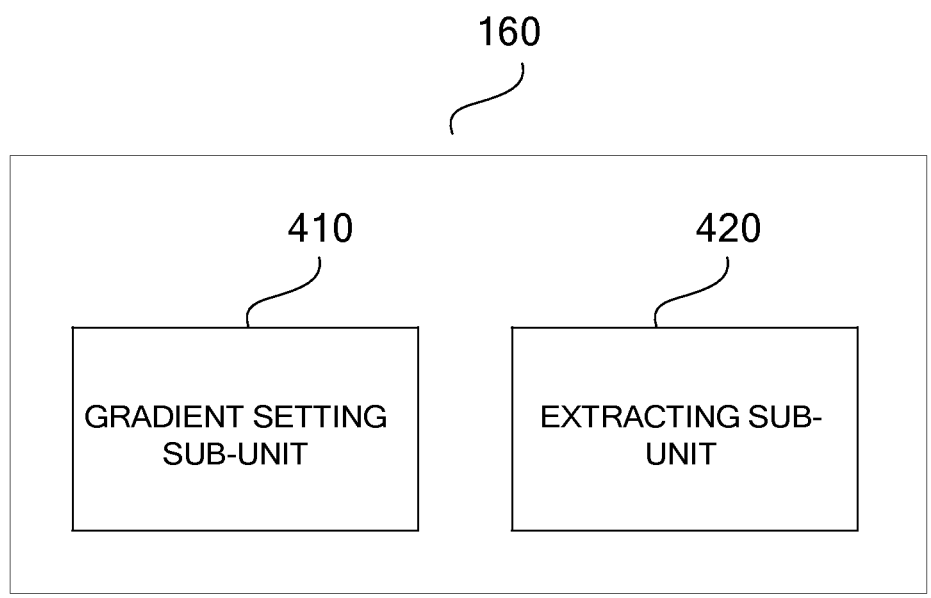
FIG. 4 schematically shows a possible exemplary structure of an extracting unit shown in FIG. 1.

FIG. 4 schematically shows a possible exemplary structure of the extracting unit 160 shown in FIG. 1. As shown in FIG. 4, in one implementation of the apparatus for extracting a boundary of an object in an image according to the embodiment of the invention, the extracting unit 160 can include a gradient setting sub-unit 410 and an extracting sub-unit 420.

In the implementation, the gradient setting sub-unit 410 can set the gradient of the reference point, thus the extracting sub-unit 420 can extract a boundary between the start pint and the end point using a boundary tracking method (such as a dynamic programming algorithm).

In an example, in a case where the gradient map of the first region is a color-inverted gradient map, the gradient value of the reference point can be set to a value below a first predetermined threshold (for example it can be set to a negative value less than 0, such as −999). In another example, in a case where the gradient map of the first region is a gradient map without being color-inverted, the gradient value of the reference point can be set to a value above a second predetermined threshold (for example it can be set to a positive value greater than 255, such as 999).

In this way, the boundary between the start point and the end point extracted by the extracting sub-unit 420 can pass the reference point with a large possibility.

As show in FIG. 2, l2 is a boundary that is extracted by using the apparatus for extracting a boundary of an object in an image according to the embodiment of the invention. It can be seen from FIG. 2 that, compared with l1, the boundary l2, which is extracted using the apparatus for extracting a boundary of an object in an image according to the embodiment of the invention, is more close to the real boundary l. As a result, the extracting accuracy of the invention is relatively high.

Figure 5:
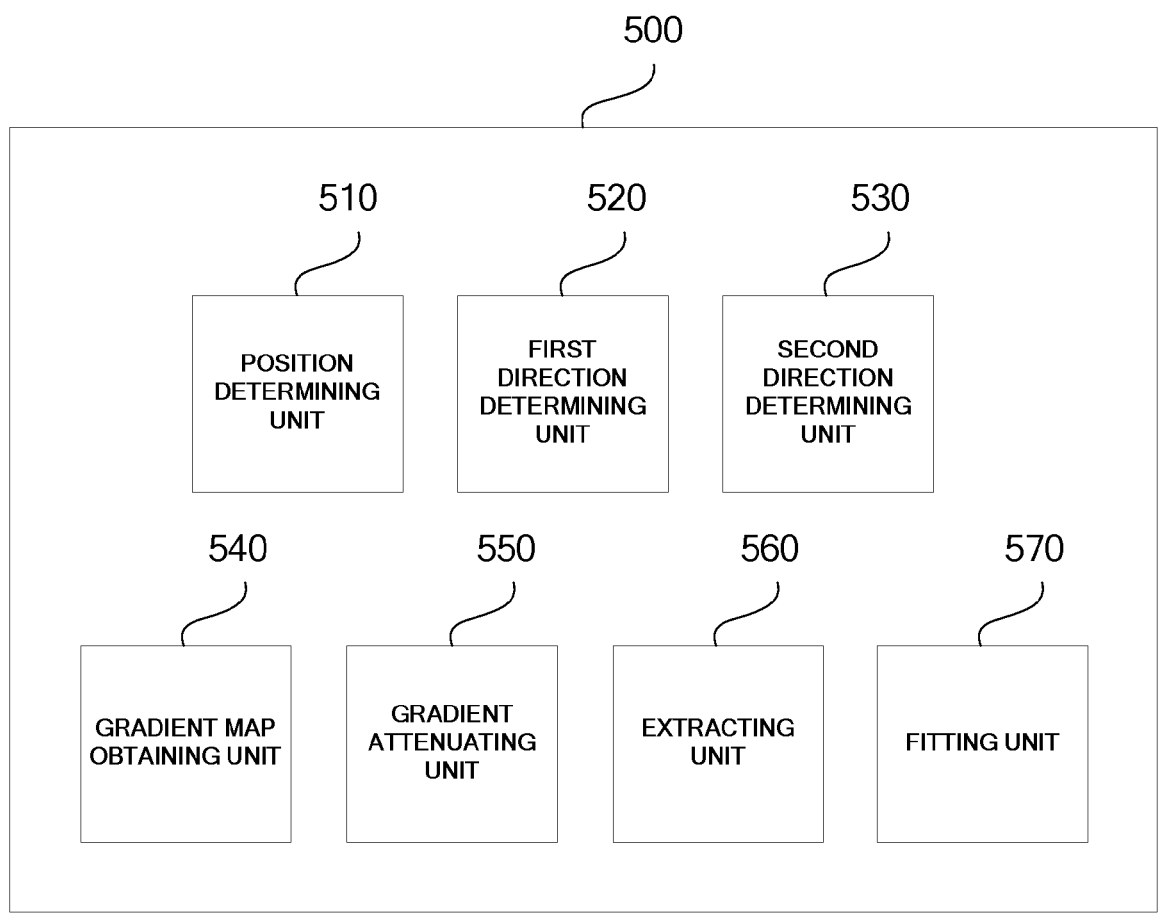
FIG. 5 is a block diagram schematically showing another exemplary structure of an apparatus for extracting a boundary of an object in an image according to an embodiment of the invention.

In addition, FIG. 5 schematically shows another exemplary structure of the apparatus for extracting a boundary of an object in an image according to the embodiment of the invention. As shown in FIG. 5, the apparatus 500 for extracting a boundary of an object in an image according to the embodiment of the invention can include a position determining unit 510, a first direction determining unit 520, a second direction determining unit 530, a gradient map obtaining unit 540, a gradient attenuating unit 550 and an extracting unit 560. In addition, the apparatus 500 can further include a fitting unit 570. The position determining unit 510, the first direction determining unit 520, the second direction determining unit 530, the gradient map obtaining unit 540, the gradient attenuating unit 550 and the extracting unit 560 can have the same structure and function as the corresponding units of the apparatus 100 shown in FIG. 1, and can achieve the similar technical effect, therefore the description thereof is omitted herein.

As shown in FIG. 5, the fitting unit 570 can fit the boundary of an object obtained by the extracting unit 560. In an example, during the fitting process of the boundary of the object, a weight of the reference point can be set to a value above a third predetermined threshold.

In this way, the boundary of the object obtained by the extracting unit 560 can be smoothed by the fitting unit 570. Furthermore, since a global model is considered, the processed boundary of the object is globally smooth and conforms to the actual situation. In addition, different fitting algorithms can be adopted according to different actual situations. For example, in a case where it is known that the boundary of the document is a straight line, the boundary of the object obtained by the extracting unit 560 can be fitted by using a straight line fitting algorithm. For example, in a case where it is known that the boundary of the document is a curve, the boundary of the object obtained by the extracting unit 560 can be fitted by using a high order polynomial fitting algorithm.

It should be noted that, the first predetermined threshold, the second predetermined threshold and the third predetermined threshold mentioned above can be determined empirically or as required, which will not be described in detail herein.

In addition, it can be seen from the above embodiments of the invention that, the boundary extracting described above can be accomplished in a case where the number of the reference points is one. However, in another embodiment of the invention, the number of the reference points can be two or more, which will lead to a higher accuracy of the extracted boundary. In a case where the number of the reference point is two or more, the boundary extracting can be performed once for each referent point input by the user, and the current extracted boundary is displayed to the user, and the user can judge whether to input the next reference point according to the accuracy degree of the current boundary. Each boundary extracting is achieved by utilizing all the reference points that exist currently, i.e. at least one second region is determined in the proximity of each of the reference points which exist currently, and the gradient of each of the second regions is attenuated to accomplish the boundary extracting.

In an example of the apparatus for extracting a boundary of an object in an image according to the embodiment of the invention, in a case where the number of the reference points is two or more, if there are two reference points the distance between which is within a predetermined distance range (for example, within a distance of three pixel points) among the two or more reference points, the gradient setting sub-unit 410 can set the gradient of each point in a connecting line between the two reference points according to the following way: in a case where the gradient map of the first region is a color-inverted gradient map, the gradients of the two reference points, the distance between which is within the predetermined distance range, can be set to values within a third predetermined neighboring region range of 0 (for example it can be set to any value in (−10,10)); in a case where the gradient map of the first region is a gradient map without being color-inverted, the gradients of the two reference points, the distance between which is within the predetermined distance range, can be set to values within a fourth predetermined neighboring region range of 255 (for example it can be set to any value in (245,265)). In this way, the boundary extracted by the extracting sub-unit 420 can pass a connecting line between the two reference points with a large possibility.

In addition, it should be noted that, the operation processing of various units of the apparatus 100 and 500 for extracting a boundary of an object in an image according to the embodiments of the invention is not necessarily performed according to the order described above, as long as the function of various units can be achieved.

In addition, although the embodiments of the invention described above are described by taking the document as an example of the object in the image, those skilled in the art should understand that in other embodiments of the invention, the object of the image can also be other objects such as a material object, and the start point and the end point of the boundary can also be other types of start points and end points besides the corner points P1 and P2.

It can be seen from the above description that, the apparatus for extracting a boundary of an object in an image according to the embodiments of the invention can enable the extracted boundary to pass the reference point with a large possibility by attenuating the gradient of the content near the reference point in the gradient map of the image, thus improving the accuracy of the boundary extracting.

In addition, when the start point and the end point of the boundary are determined, compared with the conventional boundary extracting technologies which adopt several control points to represent the whole curve, the apparatus for extracting a boundary of an object in an image according to the embodiments of the invention can extract a boundary with a higher accuracy in a case that a position of only one reference point is known, without the need of multiple manual adjustments by the user, which can improve the processing efficiency, and facilitate the use of a user.

In addition, the embodiments of the invention also provide a method for extracting a boundary of an object in an image. An exemplary process of the method for extracting a boundary of an object in an image is described hereinafter in conjunction with FIG. 6.

Figure 6:
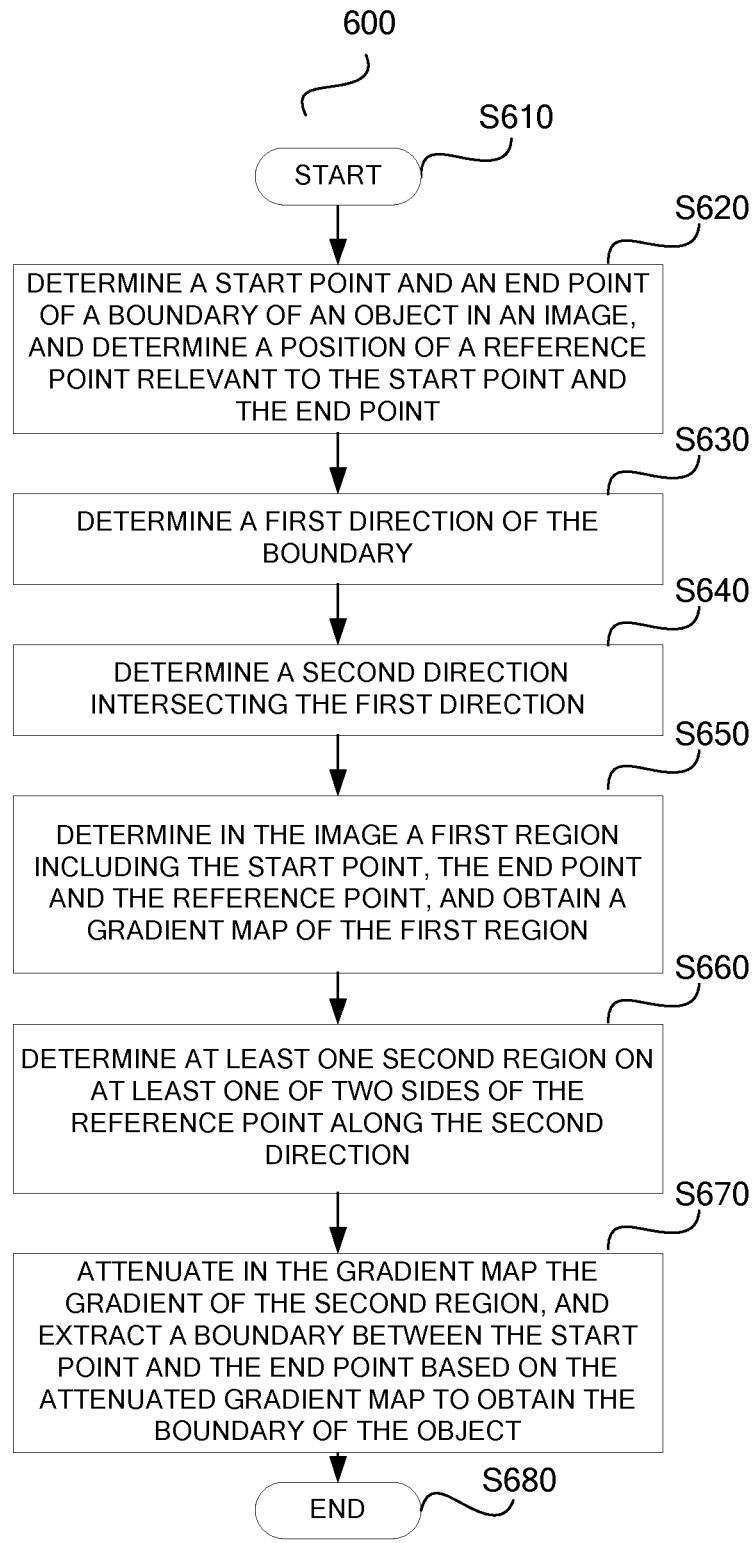
FIG. 6 is a flow chart schematically showing an exemplary processing of a method for extracting a boundary of an object in an image according to the invention.

FIG. 6 is a flow chart schematically showing an exemplary process of a method for extracting a boundary of an object in an image according to the invention.

As shown in FIG. 6, the processing flow of the method for extracting a boundary of an object in an image according to an embodiment of the invention starts from step S610. Then, step S620 is performed.

In step S620, a start point and an end point of a boundary of an object in an image are determined, and a position of a reference point relevant to the start point and the end point is determined. Then, step S630 is performed.

The object can be for example a document, or can be other types of objects such as a material object.

In step S630, a first direction of the boundary is determined. Then, step S640 is performed.

In one specific implementation, a slope direction of a connecting line between the start point and the end point can be determined, and the slope direction is determined as the first direction of the boundary. Alternatively, other ways described above can be adopted to determine the first direction of the boundary.

In step S640, a second direction intersecting (such as perpendicular to) the first direction of the boundary is determined. Then, step S650 is performed.

In step S650, a first region including the start point, the end point and the reference point is determined in the image, and a gradient map of the first region is obtained. Then, step S660 is performed.

In step S660, at least one second region is determined on at least one of two sides of the reference point along the second direction. Then, step S670 is performed.

The second region can be any one of a triangular region, a sector region, a banded region and a parabolic region. In addition, the second region can also be a superposition of at least two of the various regions above.

In addition, the second region can be located outside of a neighboring region of the reference point which has a predetermined size. The neighboring region of the reference point which has a predetermined size can be a circular region which has a predetermined size and includes the reference point therein, or can be a banded region which has a predetermined size and includes the reference point therein and the length of which extends along the first direction of the boundary. The specific description of the neighboring region of the reference point which has a predetermined size can refer to the content described above, which will not be described in detail herein.

In step S670, the gradient of the second region is attenuated in the gradient map, and the boundary between the start point and the end point is extracted based on the attenuated gradient map to obtain the boundary of the object. Then, step S680 is performed.

In step S670, the gradient of the second region can be attenuated in the gradient map. The attenuating process can refer to the processing and operation of the gradient attenuating unit 150 described in conjunction with FIG. 1 above, which will not be described in detail herein.

In addition, in step S670, the process of extracting the boundary between the start point and the end point based on the attenuated gradient map can be performed with reference to the processing operation of the gradient setting sub-unit 410 and the extracting sub-unit 420 described in conjunction with FIG. 4 above, which will not be described in detail herein.

The processing flow 600 ends at step S680.

In addition, in other exemplary processing of the method for extracting a boundary of an object in an image according to the invention, in addition to the processing described above, step S670 can also include a fitting process of the obtained boundary of the object, the specific processing of which can refer to the processing and operation of the fitting unit 570 described in conjunction with FIG. 5 above, which will not be described in detail herein.

It should be noted that, in the actual processing, the steps may be not necessarily performed in accordance with the order described above, and can be performed in other ways.

It can be seen from the description above that, the method for extracting a boundary of an object in an image according to the embodiments of the invention can enable the extracted boundary to pass the reference point with a large possibility by attenuating the gradient of the content near the reference point in the gradient map of the image, thus improving the accuracy of the boundary extracting.

In addition, when the start point and the end point of the boundary are determined, compared with the conventional boundary extracting technologies which adopt several control points to represent the whole curve, the apparatus for extracting a boundary of an object in an image according to the embodiments of the invention can extract a boundary with a higher accuracy in a case that a position of only one reference point is known, without the need of multiple manual adjustments by the user, which can improve the processing efficiency, and facilitate the use of a user.

In addition, the embodiments of the invention also provide an electronic device including the apparatus for extracting a boundary of an object in an image described above. The electronic device can be any one of a scanner, a camera, a mobile phone, a panel computer and a PAD (Personal Digital Assist) and so on. The electronic device can have the beneficial effects and advantages of the apparatus for extracting a boundary of an object in an image described above.

Component units, sub-units, etc of the apparatus for extracting a boundary of an object in an image according to the embodiments of the invention can be configured in the way of software, firmware, hardware and any combination thereof. In the case of achieving the processing by the software or the firmware, the program constituting the software or the firmware can be installed on a machine with a dedicated hardware structure (such as a general-purpose machine 700 shown in FIG. 7) from a storage medium or a network, when particular programs are installed on the machine, the machine can perform the functions of the component units and sub-units described above.

Figure 7:
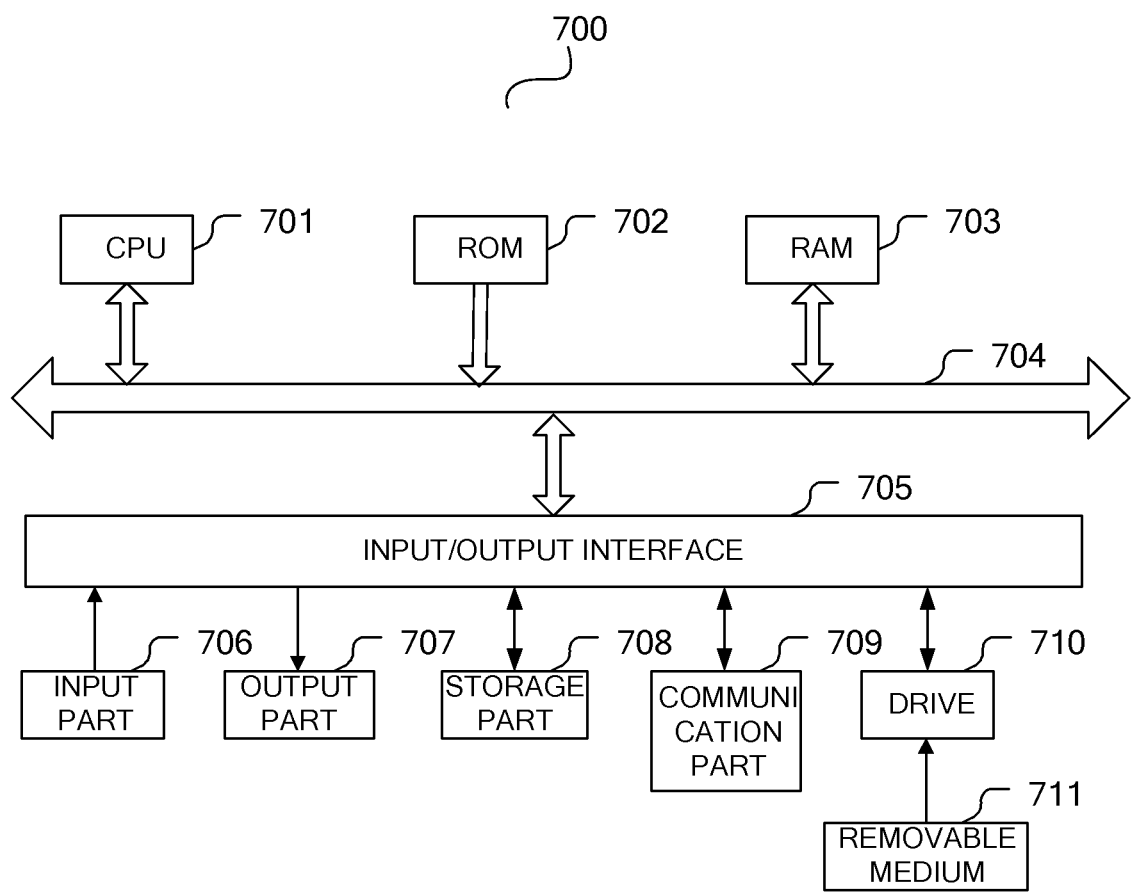
FIG. 7 is a structural diagram showing a hardware configuration of a possible information processing device for implementing an apparatus and method for extracting a boundary of an object in an image according to an embodiment of the invention.

FIG. 7 is a structural diagram showing a hardware configuration of a possible information processing device for implementing an apparatus and method for extracting a boundary of an object in an image according to the embodiments of the invention.

In FIG. 7, a Central Processing Unit (CPU) 701 performs processing according to a program stored in a Read Only Memory (ROM) 702 or a program loaded to a Random Access Memory (ROM) 703 from a storage part 708. In the RAM 703, the data needed when the CPU 701 performs processing is stored as required. The CPU 701, the ROM 702 and the RAM 703 are connected with each other via a bus 704. An input/output interface 705 is also connected with the bus 704.

The components described below are also connected with the input/output interface 705: an input part 706 (including a keyboard, a mouse etc), an output part 707 (including a display, such as a Cathode Ray Tube (CRT), a Liquid Crystal Display (LCD) and a loudspeaker etc), a storage part 708 (including a hard disc etc), a communication part 709 (including internet interface cards, such as a LAN card and a modem). The communication part 709 performs communication processing via a network such as internet. A drive 710 can also be connected with the input/output interface 705 as required. A removable medium 711 such as a magnetic disc, an optical disc, a magneto-optical disc and a semiconductor memory can be installed on the drive 710 as required, so that the computer program read from the removable medium 711 can be installed in the storage part 708 as required.

In the case of achieving the series of processing by the software, the program constituting the software can be installed from the network such as the internet or from the storage medium such as the removable medium 711.

Those skilled in the art should understand that, the storage medium is not limited to the removable medium 711 shown in FIG. 7, which has programs stored therein and is distributed separately from the device to provide the program to a user. The example of the removable medium 711 includes a magnetic disc (including a floppy disc), an optical disc (including a Compact Disc Read Only Memory (CD-ROM) and a Digital Versatile Disc (DVD)), a magneto-optical disc (including a Mini Disc (MD) (a registered trademark)) and a semiconductor memory. Alternatively, the storage medium can be a hard disc etc included in the ROM 72 or the storage part 708 on which a program is stored, and the storage medium can be distributed to the user together with a device including them.

In addition, the invention also provides a program product storing machine readable instruction codes. The execution of the machine readable instruction codes on the machine can cause the machine to perform the method for extracting a boundary of an object in an image according to the embodiment of the invention. Accordingly, the storage mediums for carrying the program product such as a magnetic disc, an optical disc, a magneto-optical disc, a semiconductor memory are also included in the disclosure of the invention.

In the description of the specific embodiments of the invention, the features described and/or illustrated for one embodiment can be used in one or more other embodiments in a same or similar way, and can be combined with the features in other embodiments, or substitute the features in other embodiments.

In addition, the execution order of the method according to the embodiments of the invention is not limited to the order described in the specification or illustrated in the drawings. The steps of the method can also be performed in accordance with other order, and can be performed in parallel or independently. Therefore, the execution order of the method described in the specification does not form a limitation to the technical scope of the invention.

In addition, obviously, the operation processes of the method of the invention can also be achieved in a form of computer executable programs stored in the machine readable storage mediums.

Furthermore, the objects of the invention can also be achieved by the following way: a storage medium which stores the executable program codes described above can be provided to the system or device directly or indirectly, and the program codes are read and executed by a computer or CPU in the system or device.

Meanwhile, as long as the system or device has the function to perform the program, the implementation of the invention is not limited to the program, and the program can be a program in any form, such as an object program, a program performed by an interpreter or a script program provided to an operating system.

The machine readable storage medium described above includes but not limited to: various memories and storage units, semiconductor devices, magnetic disc units such as an optical disc, a magnetic disc and a magneto-optical disc, and mediums suitable for storing information and so on.

In addition, the invention can also be achieved in the following way: a client computer is connected to a corresponding network station on internet, downloads and installs the computer program codes according to the invention in the computer, and then executes the computer program codes subsequently.

At last, it should be noted that, in the specification, the relationship terms such as "left" and "right", "first" and "second" are only used to distinguish one entity or operation from another entity or operation, and do not necessarily require or indicate that there is such actual relationship or order between these entities or operations. Furthermore, terms "include", "comprise" or other variations thereof are intended to cover the non-exclusive "including", so that the process, method, article or device including a series of elements includes not only the described elements, but also other elements that are not listed definitely, or also include the inherent elements of the process, method, article or device. In a case where there is no more limitations, the elements defined by a phrase "including a . . ." does not exclude that there are other same elements in the process, method, article or apparatus which include the described elements.

In summary, in the embodiments according to the invention, the invention provides the following solution:

Appendix 1. An apparatus for extracting a boundary of an object in an image, including:

a position determining unit, configured to determine a start point and an end point of the boundary of the object in the image, and to determine a position of a reference point relevant to the start point and the end point;

a first direction determining unit, configured to determine a first direction of the boundary;

a second direction determining unit, configured to determine a second direction intersecting the first direction;

a gradient map obtaining unit, configured to determine in the image a first region including the start point, the end point and the reference point, and to obtain a gradient map of the first region;

a gradient attenuating unit, configured to determine at least one second region on at least one of two sides of the reference point along the second direction, and to attenuate in the gradient map the gradients of the second region; and an extracting unit, configured to extract a boundary between the start point and the end point based on the attenuated gradient map to obtain the boundary of the object.

Appendix 2. The apparatus for extracting a boundary of an object in an image according to Appendix 1, where the object is a document.

Appendix 3. The apparatus for extracting a boundary of an object in an image according to Appendix for 2, where the first direction determining unit is configured:

to obtain a slope direction of a connecting line between the start point and the end point; and to determine the slope direction of the connecting line as the first direction of the boundary.

Appendix 4. The apparatus for extracting a boundary of an object in an image according to any one of Appendices 1 to 3, where the second direction is perpendicular to the first direction of the boundary.

Appendix 5. The apparatus for extracting a boundary of an object in an image according to any one of Appendices 1 to 4, where the second region includes one of or a superposition of at least two of a triangular region, a sector region, a banded region and a parabolic region.

Appendix 6. The apparatus for extracting a boundary of an object in an image according to any one of Appendices 1 to 5, where a shape and/or a position of the second region is adjusted in response to an instruction input by a user.

Appendix 7. The apparatus for extracting a boundary of an object in an image according to any one of Appendices 1 to 6, where the second region is located outside of a neighboring region of the reference point which has a predetermined size.

Appendix 8. The apparatus for extracting a boundary of an object in an image according to Appendix 7, where the neighboring region of the reference point which has a predetermined size is the following region:

a banded region with a predetermined size which includes the reference point therein, with the length of the banded region extending along the first direction of the boundary; or a circular region with a centre at the reference point.

Appendix 9. The apparatus for extracting a boundary of an object in an image according any one of Appendices 1 to 8, where the gradient values of the second region in the attenuated gradient map are greater than the gradient values of the second region in the non-attenuated gradient map in the case that the gradient map is a color-inverted gradient map; and the gradient values of the second region in the attenuated gradient map are less than the gradient values of the second region in the non-attenuated gradient map in the case that the gradient map is a gradient map without being color-inverted.

Appendix 10. The apparatus for extracting a boundary of an object in an image according to any one of Appendices 1 to 9, where the extracting unit includes:

a gradient setting sub-unit, configured to set the gradient value of the reference point to a value below a first predetermined threshold in a case where the gradient map is a color-inverted gradient map, and to set the gradient value of the reference point to a value above a second predetermined threshold in a case where the gradient map is a gradient map without being color-inverted; and an extracting sub-unit, configured to extract a boundary between the start point and the end point using a boundary tracking method, an to determine the extracted boundary as the boundary of the object.

Appendix 11. The apparatus for extracting a boundary of an object in an image according to Appendix 10, where the gradient setting sub-unit is further configured as follows:

in a case where there are two reference points in the reference points the distance between which is within a predetermined distance range, if the gradient map is a color-inverted gradient map, the gradients of the two reference points, the distance between which is within the predetermined distance range, are set to values within a third predetermined neighboring region range of 0; and if the gradient map is a gradient map without being color-inverted, the gradients of the two reference points, the distance between which is within the predetermined distance range, are set to values within a fourth predetermined neighboring region range of 255.

Appendix 12. The apparatus for extracting a boundary of an object in an image according to any one of Appendices 1 to 11, further including: a fitting unit configured to fit the boundary of the object obtained by the extracting unit.

Appendix 13. The apparatus for extracting a boundary of an object in an image according to Appendix 12, where the fitting unit is configured to set a weight of the reference point to be greater than a third predetermined threshold during a fitting process for the boundary of the object obtained by the extracting unit.

Appendix 14. A method for extracting a boundary of an object in an image, including:

determining a start point and an end point of the boundary of the object in the image, and determining a position of a reference point relevant to the start point and the end point;

determining a first direction of the boundary;

determining a second direction intersecting the first direction;

determining in the image a first region including the start point, the end point and the reference point, and obtaining a gradient map of the first region;

determining at least one second region on at least one of two sides of the reference point along the second direction; and attenuating in the gradient map the gradients of the second region, and extracting a boundary between the start point and the end point based on the attenuated gradient map to obtain the boundary of the object.

Appendix 15. The method for extracting a boundary of an object in an image according to Appendix 14, where the object is a document.

Appendix 16. The method for extracting a boundary of an object in an image according to Appendix 14 or 15, where the step of determining the first direction of the boundary includes:

obtaining a slope direction of a connecting line between the start point and the end point; and determining the slope direction of the connecting line as the first direction of the boundary.

Appendix 17. The method for extracting a boundary of an object in an image according to any one of Appendices 14 to 16, where the second direction is perpendicular to the first direction of the boundary.

Appendix 18. The method for extracting a boundary of an object in an image according to any of Appendices 14 to 17, where the second region includes one of or a superposition of at least two of a triangular region, a sector region, a banded region, and a parabolic region.

Appendix 19. The method for extracting a boundary of an object in an image according to any one of Appendices 14 to 18, where the second region is located outside of a neighboring region of the reference point which has a predetermined size.

Appendix 20. The method for extracting a boundary of an object in an image according to Appendix 19, where the neighboring region of the reference point which has a predetermined size is the following region: a banded region having a predetermined size which includes the reference point therein, with a length of the banded region extending along the first direction of the boundary; or a circular region with a centre at the reference point.

Appendix 21. The method for extracting a boundary of an object in an image according to any one of Appendices 14 to 20, where the step of the extracting a boundary between the start point and the end point based on the attenuated gradient map includes:

setting the gradient value of the reference point to a value below a first predetermined threshold in a case where the gradient map is a color-inverted gradient map;

setting the gradient value of the reference point to a value above a second predetermined threshold in a case where the gradient map is a gradient map without being color-inverted; and extracting a boundary between the start point and the end point using a boundary tracking method, and determining the extracted boundary as the boundary of the object.

Appendix 22. The method for extracting a boundary of an object in an image according to any one of Appendices 14 to 21, further including: fitting the obtained boundary of the object.

Appendix 23. An electronic device including the apparatus for extracting a boundary of an object in an image according to any one of Appendices 1 to 13.

Appendix 24. The electronic device according to Appendix 23, where the electronic device is any one of a scanner, a camera, a computer, a mobile phone, a panel computer and a PAD (Personal Digital Assistant).

Appendix 25. A computer readable storage medium on which a computer program that can be executed by a computing device is stored, where execution of the computer program enables the computing device to perform the method for extracting a boundary of an object in an image according to any of Appendices 14 to 22.

The invention claimed is:

1. An apparatus for extracting a boundary of an object in an image, comprising:

memory;

a processor coupled to the memory and configured to:

determine a start point and an end point of the boundary of the object in the image and to determine a position of a reference point relevant to the start point and the end point;

determine a first direction of the boundary;

determine a second direction intersecting the first direction;

determine in the image a first region comprising the start point, the end point and the reference point and to obtain a gradient map of the first region;

determine at least one second region on at least one of two sides of the reference point along the second direction and to attenuate in the gradient map the gradients of the second region; and extract a boundary between the start point and the end point based on the attenuated gradient map to obtain the boundary of the object.

2. The apparatus for extracting a boundary of an object in an image according to claim 1, wherein the object is a document.

3. The apparatus for extracting a boundary of an object in an image according to claim 1, wherein the processor is further configured:

to obtain a slope direction of a connecting line between the start point and the end point; and to determine the slope direction of the connecting line as the first direction of the boundary.

4. The apparatus for extracting a boundary of an object in an image according to claim 1, wherein the second direction is perpendicular to the first direction of the boundary.

5. The apparatus for extracting a boundary of an object in an image according to claim 1, wherein the second region comprises one of or a superposition of at least two of a triangular region, a sector region, a banded region and a parabolic region.

6. The apparatus for extracting a boundary of an object in an image according to claim 1, wherein a shape and/or a position of the second region is adjusted in response to an instruction input by a user.

7. The apparatus for extracting a boundary of an object in an image according to claim 1, wherein the second region is located outside of a neighboring region of the reference point which has a predetermined size.

8. The apparatus for extracting a boundary of an object in an image according to claim 7, wherein the neighboring region of the reference point which has a predetermined size is the following region:

a banded region with a predetermined size which comprises the reference point therein, with the length of the banded region extending along the first direction of the boundary; or a circular region with a centre at the reference point.

9. The apparatus for extracting a boundary of an object in an image according to claim 1, wherein the gradient values of the second region in the attenuated gradient map are greater than the gradient values of the second region in the non-attenuated gradient map in a case where the gradient map is a color-inverted gradient map; and the gradient values of the second region in the attenuated gradient map are less than the gradient values of the second region in the non-attenuated gradient map in a case where the gradient map is a gradient map without being color-inverted.

10. The apparatus for extracting a boundary of an object in an image according to claim 1, wherein the processor is further configured to:

set the gradient value of the reference point to a value below a first predetermined threshold in a case where the gradient map is a color-inverted gradient map, and to set the gradient value of the reference point to a value above a second predetermined threshold in a case where the gradient map is a gradient map without being color-inverted; and extract a boundary between the start point and the end point using a boundary tracking method and to determine the extracted boundary as the boundary of the object.

11. The apparatus for extracting a boundary of an object in an image according to claim 10, wherein the processor is further configured as follows:

in a case where there are two reference points in the reference points the distance between which is within a predetermined distance range, if the gradient map is a color-inverted gradient map, the gradients of the two reference points, the distance between which is within the predetermined distance range, are set to values within a third predetermined neighboring region range of 0; and if the gradient map is a gradient map without being color-inverted, the gradients of the two reference points, the distance between which is within the predetermined distance range, are set to values within a fourth predetermined neighboring region range of 255.

12. The apparatus for extracting a boundary of an object in an image according to claim 1, wherein the processor is further configured to:

fit the boundary of the object obtained.

13. The apparatus for extracting a boundary of an object in an image according to claim 12, wherein the processor is further configured to set a weight of the reference point to be greater than a third predetermined threshold during a fitting process for the boundary of the object obtained.

14. An electronic device, comprising the apparatus for extracting a boundary of an object in an image according to claim 1.

15. The electronic device according to claim 14, wherein the electronic device is any one of a scanner, a camera, a computer, a mobile phone, a panel computer and a PAD (Personal Digital Assistant).

16. A method for extracting a boundary of an object in an image, comprising:

determining a start point and an end point of the boundary of the object in the image and determining a position of a reference point relevant to the start point and the end point;

determining a first direction of the boundary;

determining a second direction intersecting the first direction;

determining in the image a first region comprising the start point, the end point and the reference point, and obtaining a gradient map of the first region;

determining at least one second region on at least one of two sides of the reference point along the second direction;

attenuating in the gradient map the gradients of the second region and extracting a boundary between the start point and the end point based on the attenuated gradient map to obtain the boundary of the object.

17. The method for extracting a boundary of an object in an image according to claim 16, wherein the object is a document.

18. The method for extracting a boundary of an object in an image according to claim 16, wherein the step of determining the first direction of the boundary comprises:

obtaining a slope direction of a connecting line between the start point and the end point; and determining the slope direction of the connecting line as the first direction of the boundary.

19. The method for extracting a boundary of an object in an image according to claim 16, wherein the second direction is perpendicular to the first direction of the boundary.

20. A non-transitory computer readable storage medium on which a computer program that can be executed by a computing device is stored, wherein execution of the computer program enables the computing device to perform the method for extracting a boundary of an object in an image according to claim 16.

* * * * *